United States Patent
Al Saud et al.

(10) Patent No.: US 11,604,910 B2
(45) Date of Patent: Mar. 14, 2023

(54) MULTISCALE MODELING WORKFLOW OF ADVANCED WATERFLOODING

(71) Applicant: Saudi Arabian Oil Company, Dhahran (SA)

(72) Inventors: Moataz Abu Al Saud, Dhahran (SA); Subhash Chandrabose Ayirala, Dhahran (SA); Ali Yousef, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 291 days.

(21) Appl. No.: 16/838,275

(22) Filed: Apr. 2, 2020

(65) Prior Publication Data
US 2021/0312111 A1    Oct. 7, 2021

(51) Int. Cl.
*G06F 30/28*    (2020.01)
*E21B 43/16*    (2006.01)
(Continued)

(52) U.S. Cl.
CPC ............ *G06F 30/28* (2020.01); *E21B 43/162* (2013.01); *E21B 43/20* (2013.01); *E21B 47/04* (2013.01);
(Continued)

(58) Field of Classification Search
CPC .... G06F 30/28; G06F 2111/10; E21B 43/162; E21B 43/20; E21B 47/04; E21B 47/08; E21B 2200/20; E21B 43/16
See application file for complete search history.

(56) References Cited

U.S. PATENT DOCUMENTS 8,776,880 B2    7/2014    Pich et al.
10,000,687 B2    6/2018    Al-Yousef et al.
(Continued)

FOREIGN PATENT DOCUMENTS

EP    2596208    5/2013

OTHER PUBLICATIONS

Arman Darvish Sarvestani, et al., "Smart water flooding performance in carbonate reservoirs: an experimental approach for tertiary oil recovery," Journal of Petroleum Exploration and Production Technology pp. 1-15 (Year: 2019).*
(Continued)

*Primary Examiner* — Steven W Crabb
(74) *Attorney, Agent, or Firm* — Fish & Richardson P.C.

(57) ABSTRACT

Disclosed are methods, systems, and computer-readable medium to perform operations including performing, using a nanoscale model, a simulation of fluid-fluid and fluid-rock interactions in the subterranean formation. The operations also include upscaling first results of the simulation of fluid-fluid and fluid-rock interactions to a microscale level. The operations further include performing, using a microscale model and the upscaled first results, a simulation of fluid flow inside rocks of the subterranean formation. Additionally, the operations include upscaling second results of the simulation of fluid flow inside rocks to a macroscale level. Further, the operations include performing, using a core-scale model and the upscaled second results, a simulation of fluid flow across the subterranean formation.

20 Claims, 8 Drawing Sheets

(51) Int. Cl.
  *E21B 43/20* (2006.01)
  *E21B 47/04* (2012.01)
  *E21B 47/08* (2012.01)
  *G06F 111/10* (2020.01)

(52) U.S. Cl.
  CPC .......... *E21B 47/08* (2013.01); *E21B 2200/20* (2020.05); *G06F 2111/10* (2020.01)

(56) References Cited

U.S. PATENT DOCUMENTS

| | | | |
|---|---|---|---|
| 10,287,486 B2 | 5/2019 | Ayirala et al. | |
| 2002/0035040 A1 | 3/2002 | Talashek et al. | |
| 2011/0112815 A1 | 5/2011 | Stukan et al. | |
| 2011/0306525 A1 | 12/2011 | Lightheim | |
| 2012/0232859 A1* | 9/2012 | Pomerantz | G01V 1/282 703/2 |
| 2013/0274149 A1 | 10/2013 | Lafitte et al. | |
| 2017/0015893 A1 | 1/2017 | Al-Yousef et al. | |
| 2017/0234126 A1* | 8/2017 | Al-Shalabi | E21B 43/20 166/250.02 |
| 2017/0298714 A1 | 10/2017 | Ferreira et al. | |
| 2018/0253514 A1 | 9/2018 | Bryant et al. | |
| 2018/0259499 A1 | 9/2018 | Al-Yousef et al. | |
| 2018/0291717 A1 | 10/2018 | Ayirala et al. | |

OTHER PUBLICATIONS

Ayirala et al., "Multiscale water ion interactions at interfaces for enhanced understanding of smartwater flooding in carbonates," IPTC-19066, presented at the International Petroleum Technology Conference, Bejing, China, Mar. 26-28, 2019, 16 pages.

Ayirala et al., "Linking pore scale mechanisms with macroscopic to core scale effects in controlled ionic composition low salinity waterflooding processes," IPC Science and Technology Press, Fuel, Dec. 2019, 264, 12 pages.

PCT International Search Report and Written Opinion in International Appln. No. PCT/US2021/024854, dated Jul. 1, 2021, 16 pages.

Pak et al., "Multiscale pore-network representation of heterogeneous carbonate rocks," AGU Publications, Water Resources Research, 2016, 9 pages.

* cited by examiner

MULTISCALE MODELING WORKFLOW OF ADVANCED WATERFLOODING

TECHNICAL FIELD

The present disclosure relates to simulation of hydrocarbon reservoirs.

BACKGROUND

The oil and gas industry has developed numerous enhanced oil recovery (EOR) methods that include chemical, thermal, and gas based processes. Water injection, also known as waterflooding, is a commonly used EOR method. In this method, water is injected to an oil-bearing reservoir to increase pressure in the reservoir, thereby displacing residual oil and increasing oil production. The injected water can be seawater, aquifer water, or any surface water.

SUMMARY

Recently, it has been found that an effect of the water chemistry of the injected water has an impact on oil recovery processes, particularly in carbonate formations. Based on this finding, some waterflooding methods have altered the ionic composition of the injected water to improve hydrocarbon recovery from carbonate reservoirs without injecting additional chemicals or fluids with the injected water. In order to maintain and improve oil production from subterranean formations, it is useful to understand enhanced oil recovery (EOR) processes. One way to understand EOR processes is to simulate performance of the processes. However, existing models do not accurately simulate performance of the processes, particularly more complex processes (for example, the waterflooding mechanism that alters the ionic composition of the injected water).

This disclosure describes a workflow for modeling EOR processes, such as waterflooding, in order to improve oil production from subterranean formations. The disclosed workflow more accurately models waterflooding processes than existing models, and therefore, facilitates determining parameters for waterflooding processes that improve the performance of the processes over what is achievable in practice.

Aspects of the subject matter described in this specification may be embodied in methods that include the actions of: performing, using a nanoscale model, a simulation of fluid-fluid and fluid-rock interactions in the subterranean formation; upscaling first results of the simulation of fluid-fluid and fluid-rock interactions to a microscale level; performing, using a microscale model and the upscaled first results, a simulation of fluid flow inside rocks of the subterranean formation; upscaling second results of the simulation of fluid flow inside rocks to a macroscale level; and performing, using a core-scale model and the upscaled second results, a simulation of fluid flow across the subterranean formation.

The previously-described implementation is implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In a first aspect, the methods further comprising determining waterflooding parameters that increase oil recovery from the subterranean formation.

In a second aspect, where the first results comprise a set of parameters that characterize brine/crude-oil/calcite interfaces at the nanoscale, and where the set of parameters comprises zeta-potential for surface charges, intermolecular forces, contact-angle, adhesive, and cohesive forces.

In a third aspect, where the second results comprise a set of parameters that characterize the fluids inside the rock pore space, and where the parameters comprise brine and crude-oil spatial distribution, residual oil, pressure distribution, velocity distribution, porosity, and permeability.

In a fourth aspect, where third results of the simulation of fluid flow across the subterranean formation comprise a set of parameters including pressure drop across the subterranean formation, injection rate, oil recovery rate, and connate brine composition.

In a fifth aspect, where the nanoscale model is based on one or more of surface complexation models (SCM), molecular dynamics (MD), and density functional theory (DFT).

In a sixth aspect, where the microscale model is based on one or more of computational fluid dynamics, Lattice-Boltzmann methods, pore-network modeling, and percolation theory.

In a seventh aspect, wherein the macroscale model is based on one or more of multiphase Darcy's law, dual porosity theory, Darcy-Brinkman's law, and Darcy-Forchheimer's law.

The subject matter described in this specification can be implemented in particular implementations, so as to realize one or more of the following advantages. The disclosed workflow provides an improved insight on the physiochemical interactions associated with EOR processes. Additionally, the disclosed workflow improves waterflooding processes and increases the recovery of crude oil and relevant hydrocarbons from subsurface formations.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

As previously described, understanding the mechanisms related to oil recovery is useful for maintaining and improving oil production from subterranean formations. For example, numerical models of processes are used in the oil and gas industry to understand petroleum exploration and production activities. These numerical models are used to identify and screen new prospects, to optimize recovery mechanisms, and to design optimal surface facilities. In the context of enhanced oil recovery (EOR) processes, macroscale models (for example, reservoir scale models) have been developed to mimic and understand performance of the processes inside a subterranean formation. However, these macroscale models do not provide thorough details of the physicochemical reservoir interactions, such as those occurring at fluid-fluid and fluid-rock interfaces.

Disclosed is a workflow for accurately modeling and simulating EOR processes. In particular, the disclosed workflow provides insight on the physiochemical interactions associated with EOR processes. Understanding the interfacial physiochemical interactions occurring at the microscopic scale and the nanoscale is useful for improving (for example, optimizing) EOR processes. For example, in waterflooding methods, there is a complex interaction of a myriad of forces, such as viscous, capillary, gravity, reactive, and electrokinetic forces. Such forces, which occur at small scales (for example, atomic-scales or pore-scales), dictate the oil recovery at the reservoir scale (for example, a mile or kilometer scale). The disclosed workflow facilitates understanding of these forces, which in turn, facilitates determining parameters for improved waterflooding processes, thereby increasing the recovery of crude oil and other relevant hydrocarbons.

Figure 1:
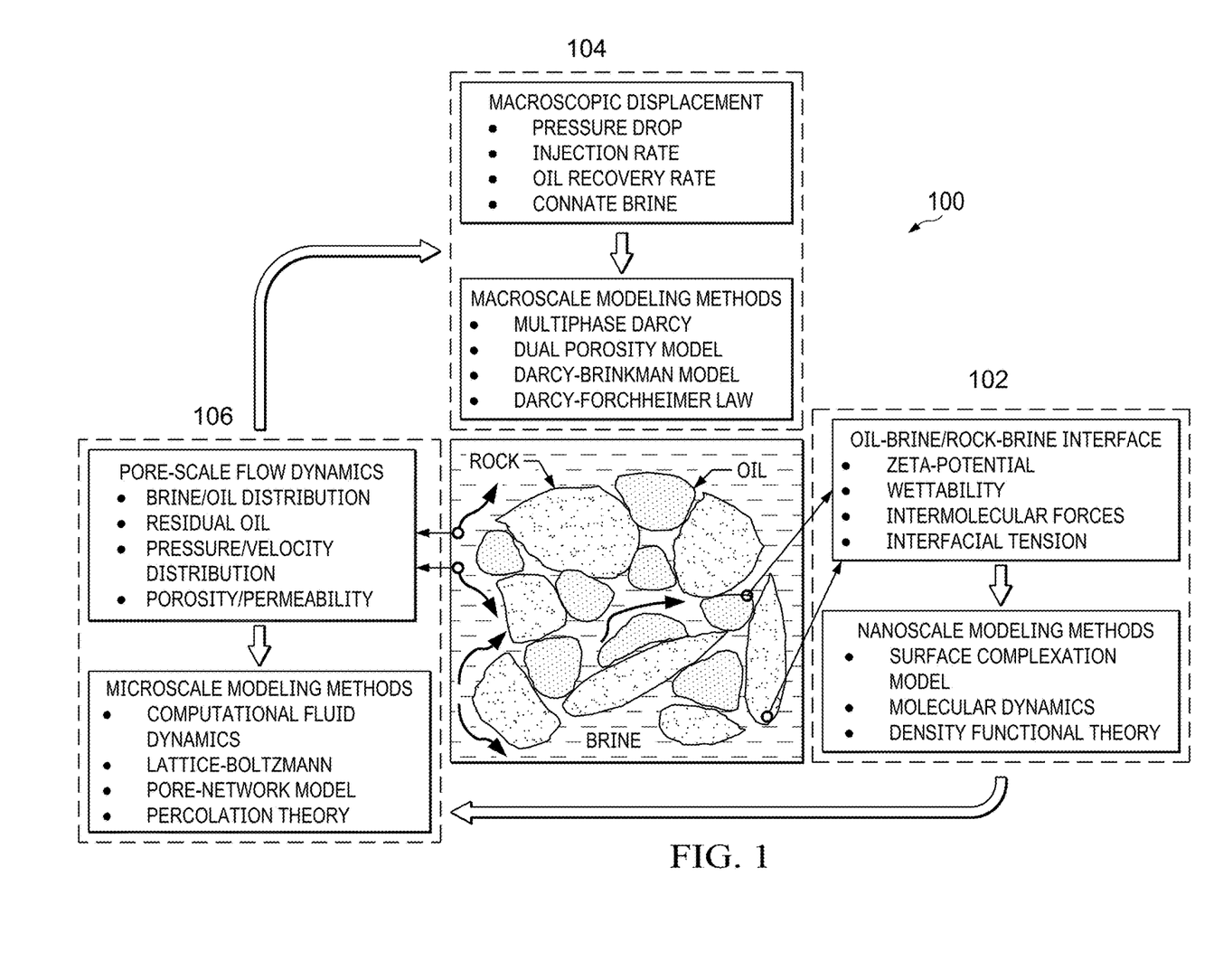
FIG. 1 illustrates a modeling workflow, according to some implementations of the present disclosure.

FIG. 1 illustrates a modeling workflow 100, according to some implementations. The modeling workflow 100 is a workflow for accurately modeling and simulating an EOR process in a subterranean formation (for example, an oil-bearing reservoir). As shown in FIG. 1, the modeling framework is a multi-scale workflow that includes nanoscale modeling 102, pore-scale modeling 104, and macroscale modeling 106. As also shown in FIG. 1, the modeling workflow 100 is an interdependent workflow in which an output of a modeling process can be used as an input for one or more of the other modeling processes.

In the nanoscale modeling 102, a simulation is performed using a nanoscale model to analyze fluid-fluid and fluid-rock interactions at a nanoscale level of the subterranean formation. The nanoscale model may be based on one or more of surface complexation models (SCM), molecular dynamics (MD), and density functional theory (DFT). The output of the simulation is a set of parameters that characterize the brine/crude-oil/calcite interfaces at an atomic scale. Example nanoscale output parameters include zeta-potential for surface charges, intermolecular forces (for example, Van der Waals, Coulombic, and structural components), adhesive forces, and cohesive forces (wettability and interfacial tension).

In the pore-scale modeling 104, a simulation is performed using a pore-scale model to analyze fluid dynamics inside rock pores of the subterranean formation at a microscale level. In an implementation, the input parameters for the pore-scale simulations include upscaled nanoscale parameters. The microscale model may be based on one or more of computational fluid dynamics, Lattice-Boltzmann methods, pore-network modeling, and percolation theory. The output of the simulation is a set of parameters that characterize the fluids inside the rock pore space. Example output pore-scale parameters include brine and crude-oil spatial distribution, residual oil, pressure distribution, velocity distribution, porosity, and permeability.

In the macroscale modeling 106, macroscale simulations provide macroscopic displacement behavior for a rock sample or for various production and injection wells at the subterranean reservoir scale. In an implementation, the input parameters for the core-scale simulations include upscaled microscale parameters. The macroscale model may use one or more of multiphase Darcy's law, dual porosity theory, Darcy-Brinkman's law, and Darcy-Forchheimer's law. The output of the simulation is a set of parameters that characterize the fluids inside the rock pore space. Example parameters include pressure drop across the rock sample, injection rate, oil recovery rate, and connate brine.

Figure 2:
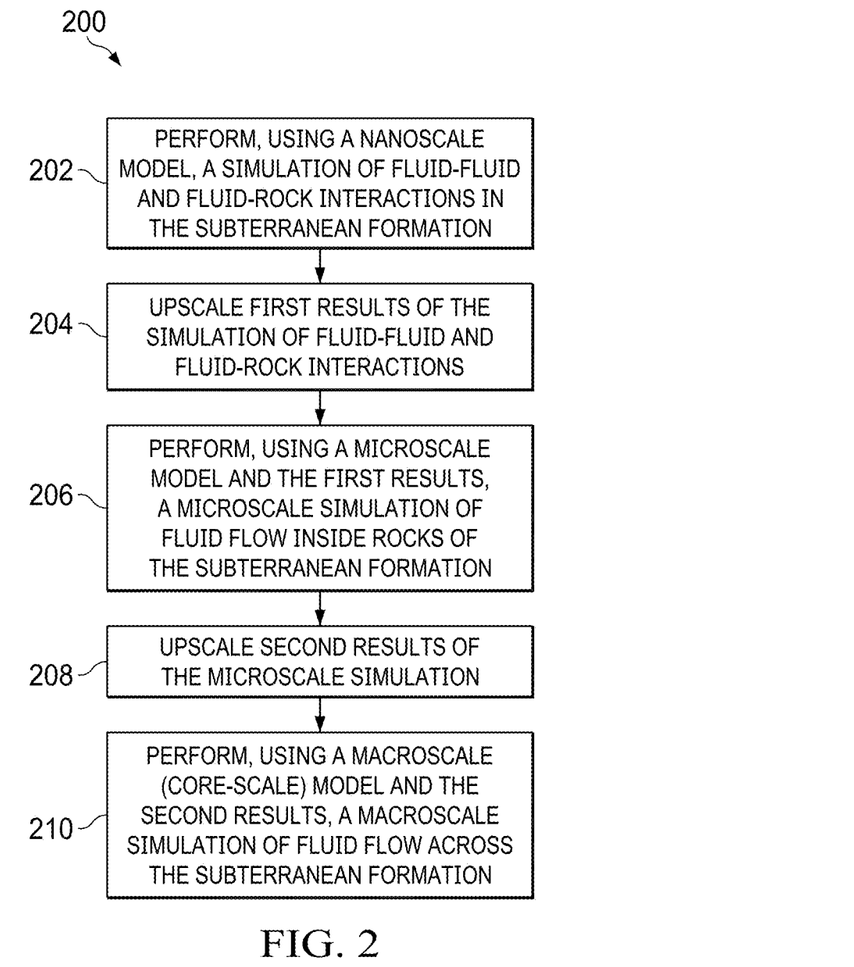
FIG. 2 illustrates a block diagram of a method for modeling an enhanced oil recovery (EOR) process, according to some implementations of the present disclosure.

FIG. 2 illustrates a block diagram of a method 200 for modeling an enhanced oil recovery (EOR) process, according to some implementations. For clarity of presentation, the description that follows generally describes method 200 in the context of the other figures in this description. For example, the method 200 can be performed by the computing system 800 shown in FIG. 8. However, it will be understood that the method 200 may be performed, for example, by any suitable system, environment, software, and hardware, or a combination of systems, environments, software, and hardware, as appropriate. In some implementations, various steps of the method 200 can be run in parallel, in combination, in loops, or in any order. The following description of method 200 is consistent with the general workflow described in FIG. 1.

Method 200 starts at step 202, where the method involves performing, using a nanoscale model of a subterranean formation, a simulation of fluid-fluid and fluid-rock interactions in the subterranean formation. In an implementation, the nanoscale model characterizes fluid-fluid and fluid-rock interactions at a nanoscale level. The nanoscale model may be based on one or more of surface complexation models (SCM), molecular dynamics (MD), and density functional theory (DFT). The outcome of the simulation is a set of parameters that characterize brine/crude-oil/calcite interfaces at the atomic scale or nanoscale. Example parameters include zeta-potential for surface charges, intermolecular forces (for example, Van der Waals, Coulombic, and structural components), contact-angle, adhesive forces, and cohesive forces (wettability and interfacial tension).

At step 204, method 200 involves upscaling first results of the simulation of fluid-fluid and fluid-rock interactions to a microscale level. Upscaling involves scaling up the results, and any derived properties from the results, from the nanoscale to the microscale. As an example, molecular dynamics (MD) modeling is performed to calculate interfacial tension of a water and oil interface. The difference between the average tangential and normal stresses (computed based on statistically averaged molecular interactions) at the fluid interface corresponds to the interfacial tension, which is an upscaled parameter based on nanoscale molecular dynamics.

At step 206, method 200 involves performing, using a microscale model and the upscaled first results, a simulation of fluid flow inside rocks of the subterranean formation at a microscale level. The microscale model characterizes fluid dynamics inside the rock pores at the microscale level. In an implementation, the input parameters for the pore-scale simulations include the computed nanoscale parameters. The microscale model may use one or more of computational fluid dynamics, Lattice-Boltzmann methods, pore-network modeling, and percolation theory. The output of the simulation is a set of parameters that characterize the fluids inside the rock pore space. Example parameters include brine and crude-oil spatial distribution, residual oil, pressure distribution, velocity distribution, porosity, and permeability.

At step 208, method 200 involves upscaling second results of the simulation of the fluid flow at the microscale to a macroscale level (for example, a core-scale level). Upscaling involves scaling up the results, and any derived properties from the results, from the microscale to the macroscale. As an example, upscaling can be performed by averaging a simulated pore-scale velocity field. Based on the applied pressure gradient, fluid viscosity, sample size, and computed average pore-scale velocity, a macroscopic permeability is calculated using a Darcy model.

At step 210, method 200 involves performing, using a macroscale model and the upscaled second results, a simulation of fluid flow inside rocks of the subterranean formation at a microscale level. The macroscale model characterizes macroscopic displacement behavior of the waterflooding process for a subterranean rock sample or for various production and injection wells at the subterranean reservoir scale. In an implementation, the input parameters for the core-scale simulations include the upscaled microscale parameters. The macroscale model may use one or more of multiphase Darcy's law, dual porosity theory, Darcy-Brinkman's law, and Darcy-Forchheimer's law. The outcome of the simulation is a set of parameters that characterize the fluids inside the rock pore space. Example parameters include pressure drop across the studied sample, injection rate, oil recovery rate, and connate brine.

More specifically, the output of the macroscale simulation is indicative of the oil recovery from a subterranean rock sample at the core-scale. In an implementation, the multiscale modeling method 200 is used to determine waterflooding parameters. For example, optimal waterflooding parameters can be determined, which leads to maximizing oil recovery from a subterranean rock sample. For instance, the ions in the brine used in waterflooding have a strong impact on the zeta-potential electrokinetic parameter, which is an input in the microscale model. The brine ions can be tuned to find the zeta-potentials that lead to minimum oil trapping at the microscale. Therefore, the multiscale method 200 can help in determining an optimal set of ions in the waterflooding that leads to maximum recovery of oil, which is the output of the macroscale simulation. Within examples, one or more input values into the model may be tuned, automatically or manually, in order to determine a desired output. For instance, the desired output may be a threshold oil recovery. Accordingly, the method 200 facilitates conducting a sensitivity analysis for injected brine properties that can further enhance and increase oil recovery in a systematic approach.

The example method 200 shown in FIG. 2 can be modified or reconfigured to include additional, fewer, or different steps (not shown in FIG. 2), which can be performed in the order shown or in a different order. As an example, after step 210, the method 200 can include determining waterflooding parameters. As another example, the method 200 can include performing a waterflooding process using the determined waterflooding parameters.

Figure 3:
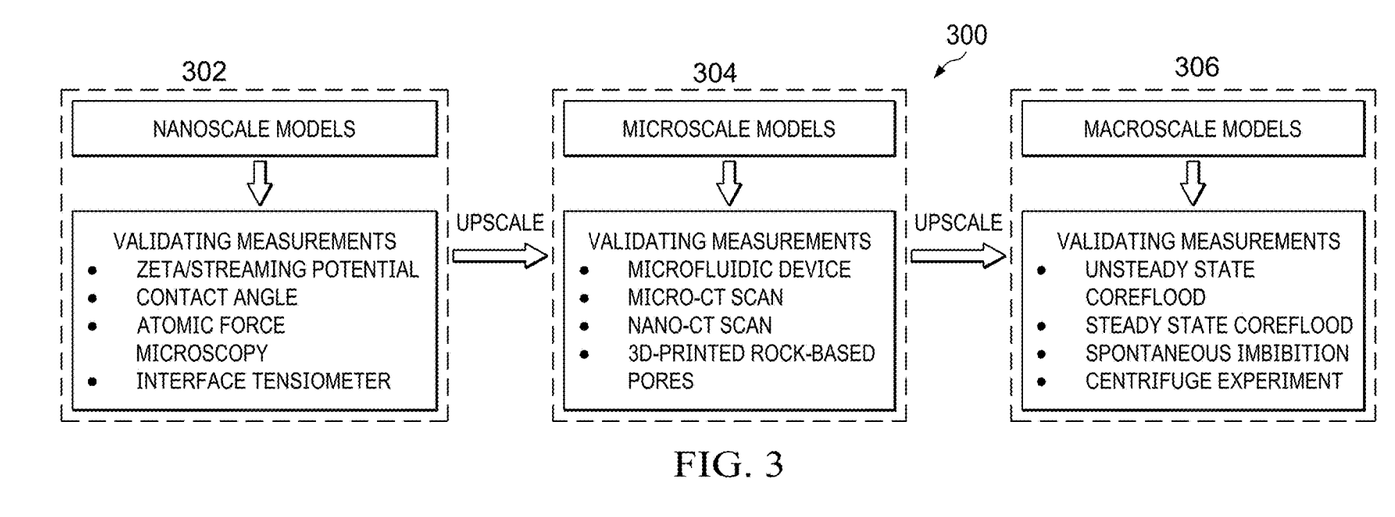
FIG. 3 illustrates a workflow for validating the modeling workflow of FIG. 1, according to some implementations of the present disclosure.

FIG. 3 illustrates a workflow 300 for validating the modeling workflow 100 of FIG. 1, according to some implementations. As shown in FIG. 3, the workflow 300 includes validating nanoscale modeling 302, validating microscale modeling 304, and validating macroscale modeling 306. In an implementation, the workflow 300 generates experimental data that is used to validate the simulated data from the modeling workflow 100.

For the nanoscale models, experimental data, such as surface/intermolecular forces, adhesion forces, interfacial tension, contact angle, thin film thickness, disjoining pressure, nano-CT images, and zeta-potentials can be used to validate the simulation results, such as interfacial tension and contact angle. Devices and tools that can be used to measure the experimental data include atomic force microscopy, interfacial tensiometer, and zeta/streaming potential analyzer. For microscale models, devices used to measure the experimental data include microfluidic devices, micro-CT scanners, SEM imaging, and 3D printed rock-replica models, each of which provide data that can be compared with pore-scale simulation results for validation purposes. For macroscale models, validating experimental measurements based on unsteady state coreflood, steady-state coreflood, centrifuge experiments, and spontaneous imbibition provide experimental data that is utilized to validate the macroscale models that are used to predict oil recovery.

FIGS. 4, 5A, 5B, 6A, 6B, and 7 illustrate example results from performing the workflow 100, according to some implementations.

TABLE 1

Composition of different brine samples
Brine samples (concentration mg/L)

| Ions | Seawater | SmartWater | NaCl | Na$_2$SO$_4$ |
|---|---|---|---|---|
| Na$^+$ | 18,300 | 1824 | 2266 | 1865 |
| Cl$^-$ | 32,200 | 3220 | 3495 | — |
| Ca$^{2+}$ | 650 | 65 | — | — |
| Mg$^{2+}$ | 2,110 | 211 | — | — |
| SO$_4^{-2}$ | 4,290 | 429 | — | 3896 |
| HCO$^{3-}$ | 120 | — | — | — |
| Total dissolved solids, ppm | 57,670 | 5,761 | 5,761 | 5,761 |
| pH | 7.45 | 7.4 | 6.3 | 6.11 |

TABLE 2

Crude-oil properties

| | |
|---|---|
| API | 27.1 |
| Acid Number mg KOH/g | 0.47 |
| Base Number mg KOH/g | 0.04 |
| Saturates (%) | 50.6 |
| Asphaltenes (%) | 1.6 |
| Resins (%) | 20.7 |
| Aromatics (%) | 27.1 |

Figure 4:
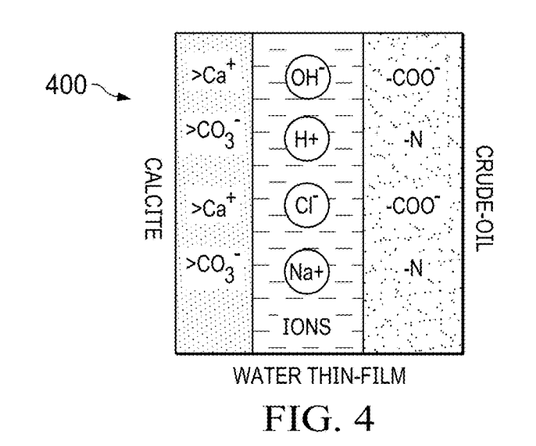
FIG. 4 illustrates an example nanoscale model, according to some implementations of the present disclosure.

FIG. 4 illustrates an example nanoscale model 400 that characterizes fluid-fluid and fluid-rock interactions at a nanoscale level. The nanoscale model 400 includes a nano-water thin-film layer 402 sandwiched between a calcite surface 404 and a crude-oil surface 406. The water thin-film 402 includes dissolved ions corresponding to a specific water-chemistry composition. Table 1 provides brine samples with example ionic compositions, and Table 2 includes properties of the crude-oil surface 406. In an implementation, a surface complexation model (SCM) is used as the nanoscale model, which describes the equilibrium state of ion adsorption based on specified surface reactions. For the calcite/brine/crude-oil model 300, the adsorption of ions on crude-oil/brine and calcite/brine interfaces determines the surface charges and the corresponding zeta-potentials, which provides information indicative of the electrokinetic and wettability properties for various water chemistries. The affinity of different ion types (listed in Table 1) is determined through surface chemistry reactions that describe the calcite and crude-oil surfaces. A list of equilibrium constants describing such surface chemistry reactions is shown in Tables 3 and 4.

TABLE 3

Surface Complexation Recations for the Calcite Surface

| Calcite Surface Reaction | Equilibrium Constant ($\log_{10} K_{int}$) |
|---|---|
| $>CaOH^{-0.75} + H^+ \leftrightarrow >CaOH_2^{+0.25}$ | 0.4 |
| $>CO_3H^{+0.75} + OH^- \leftrightarrow >CO_3^{-0.25} + H_2O$ | 0.5 |
| $>CaOH^{-0.75} + Ca^{2+} \leftrightarrow >CaOH \ldots Ca^{+1.25}$ | 1.53 |
| $>CaOH^{-0.75} + Mg^{2+} \leftrightarrow >CaOH \ldots Mg^{+1.25}$ | 1.15 |
| $>CO_3H^{+0.75} + SO_4^{2-} \leftrightarrow >CO_3H \ldots SO_4^{-1.25}$ | 1.5 |
| $>CO_3H^{+0.75} + CO_3^{2-} \leftrightarrow >CO_3H \ldots CO_3^{-1.25}$ | 2.23 |
| $>CO_3H^{+0.75} + HCO_3^- \leftrightarrow >CO_3H \ldots HCO_3^{-0.25}$ | 0.09 |
| $>CaOH^{-0.75} + Na^+ \leftrightarrow >CaOH \ldots Na^{+0.25}$ | 0.22 |
| $>CO_3H^{+0.75} + Cl^- \leftrightarrow >CO_3H \ldots Cl^{-0.25}$ | 0.65 |

TABLE 4

Surface Complexation Reactions for Crude-oil

| Crude Oil Surface Reaction | Equilibrium Constant ($\log_{10} K_{int}$) |
|---|---|
| $—COOH \leftrightarrow —COO^- + H^+$ | 6 |
| $—N + H^+ \leftrightarrow —NH^+$ | 4 |
| $—COOH + Ca^{+2} \leftrightarrow —COOCa^+ + H^+$ | −4 |
| $—COOH + Mg^{+2} \leftrightarrow —COOMg^+ + H^+$ | −4.3 |
| $—COOH + Na^+ \leftrightarrow —COONa + H^+$ | −4 |

Figure 5A:
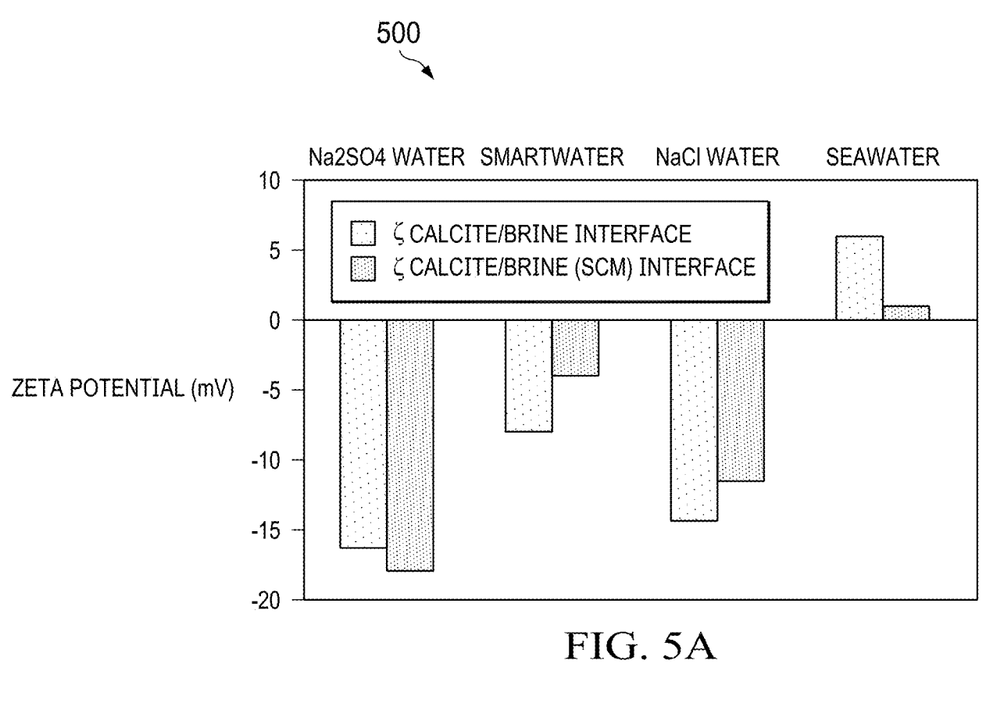
FIGS. 5A and 5B illustrate a comparison between experimental and simulated results of nanoscale modeling, according to some implementations of the present disclosure.
Figure 5B:
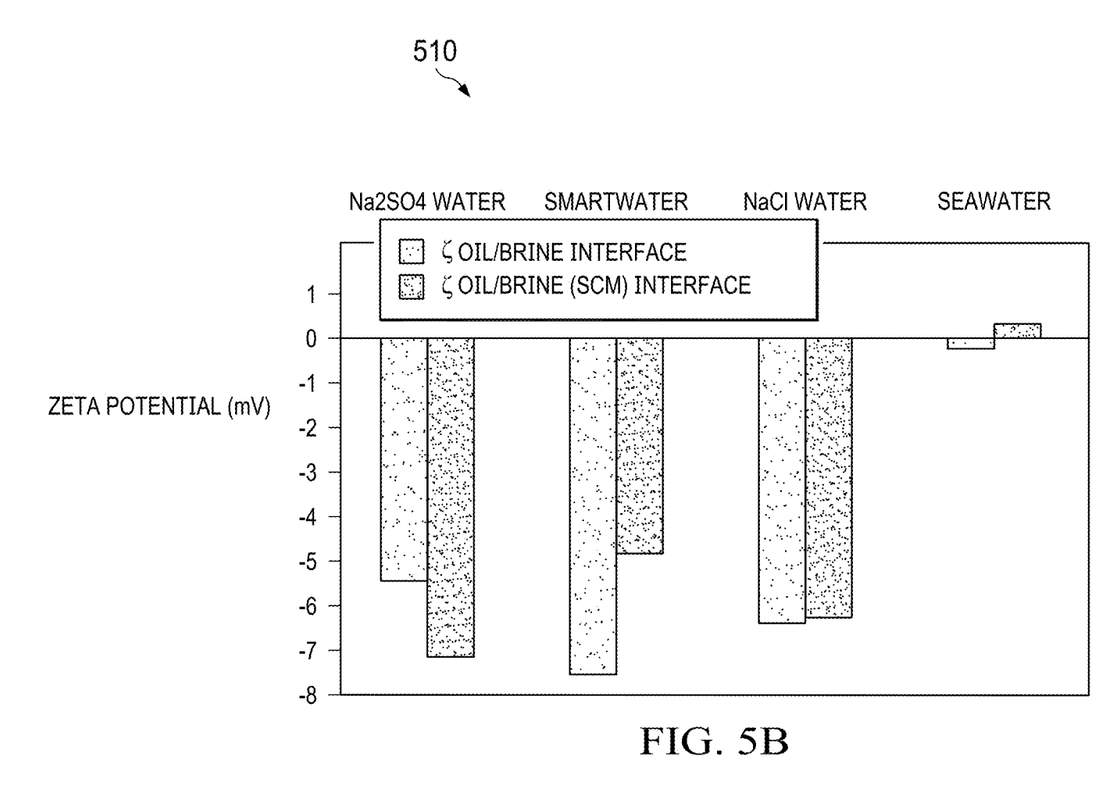

FIGS. 5A and 5B illustrate a comparison between experimental and simulated results of nanoscale modeling. Specifically, FIG. 5A illustrates a comparison between experimental and SCM zeta-potential values at the calcite/brine interface, and FIG. 5B illustrates a comparison between experimental and SCM zeta-potential values at the oil/brine interface. As shown in FIGS. 5A and 5B, experimental generated results, for example, using a zeta-potential equipment, validate the simulation results. As such, the experimental data supports the nanoscale model's characterization of the brine/crude-oil and brine/calcite interfacial interactions at the nanoscale.

Figure 6A:
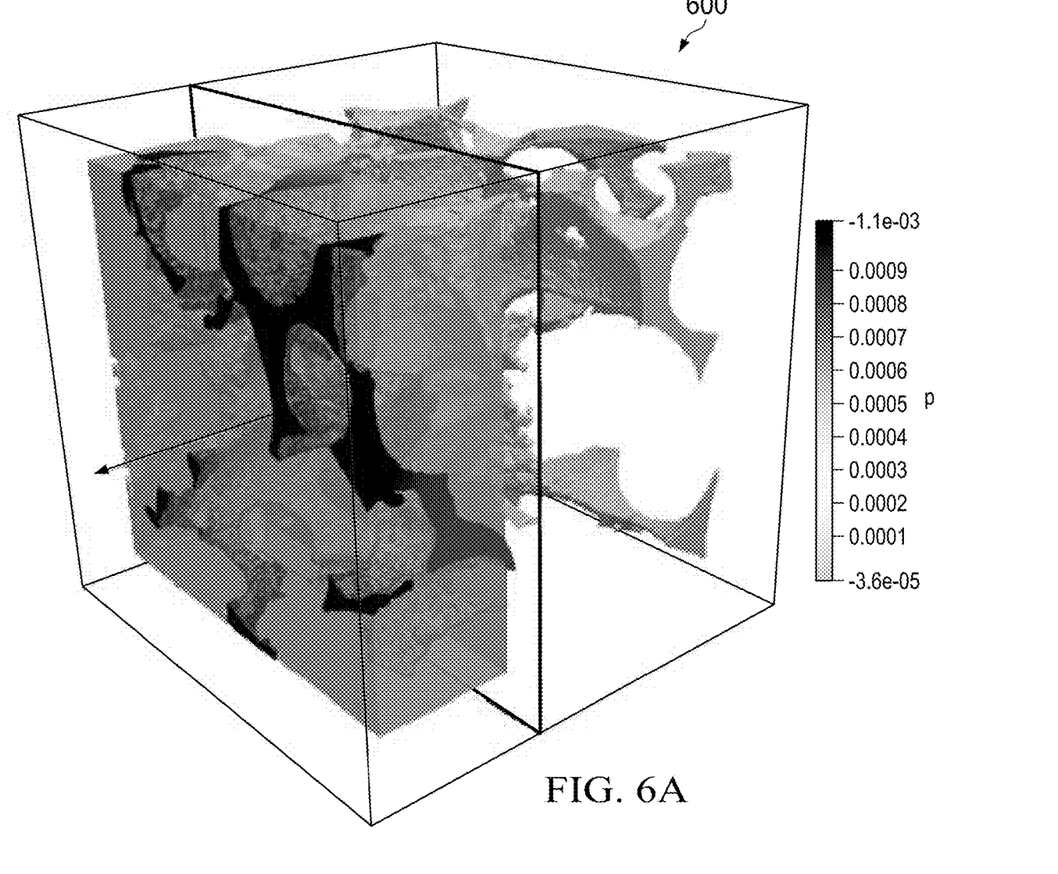
FIGS. 6A and 6B illustrate two example microscale models for simulating fluid dynamics, according to some implementations of the present disclosure.
Figure 6B:
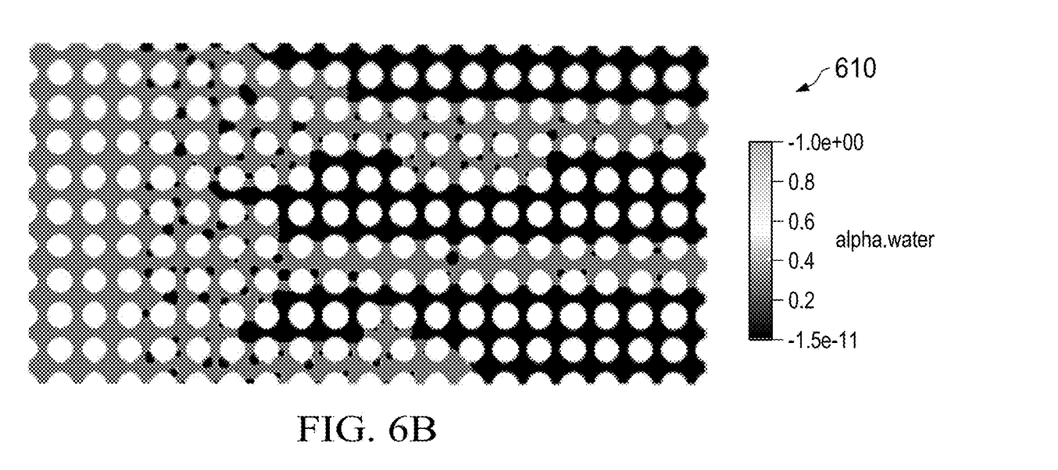

FIGS. 6A and 6B illustrate two example microscale models for simulating fluid dynamics at the pore-scale. The first example uses a micro-computed tomography (micro-CT) image scan of a rock sample, and models the fluid flow inside a void space of the rock sample. FIG. 6A illustrates the three-dimensional (3D) pressure distribution inside the rock pores. Permeability and porosity are computed based on the simulation results, which are listed in Table 5. These parameters are upscaled quantities that are used in the macroscale modeling. In the second example, a pore-scale multiphase flow simulation is conducted inside a three-dimensional (2D) transparent micromodel to visualize the fluid flow dynamics and crude-oil/brine distributions. Table 6 lists the relevant parameters for crude-oil and brine fluids. FIG. 6B illustrates that the pore-scale model predicts the remaining oil (black color) inside the micromodel void space. Such microscale models can be utilized to find the injected water parameters (for example, optimal parameters) leading to reduced (for example, a minimal) residual oil.

TABLE 5

Percentage of macro porosity, micro porosity, and permeability for a rock sample

| Rock Sample | Carbonate |
|---|---|
| Macro porosity (%) | 7.2 |
| Microporosity (%) | 3.1 |
| Total porosity (%) | 10.3 |
| Permeability k (mD) | 294 |

TABLE 6

Fluid properties used for micromodel

| Contact angle | Injected Velocity (m/s) | Viscosity $\mu_{oil}/\mu_{wat}$ (cP) | Interfacial Tension σ (N/m) | Density $\rho_{oil}/\rho_{wat}$ (kg/m³) | Width (cm) | Length (cm) |
|---|---|---|---|---|---|---|
| 65 | 0.01 | 1/1 | 0.03 | 1000/1000 | 3.3 | 6.86 |

Figure 7:
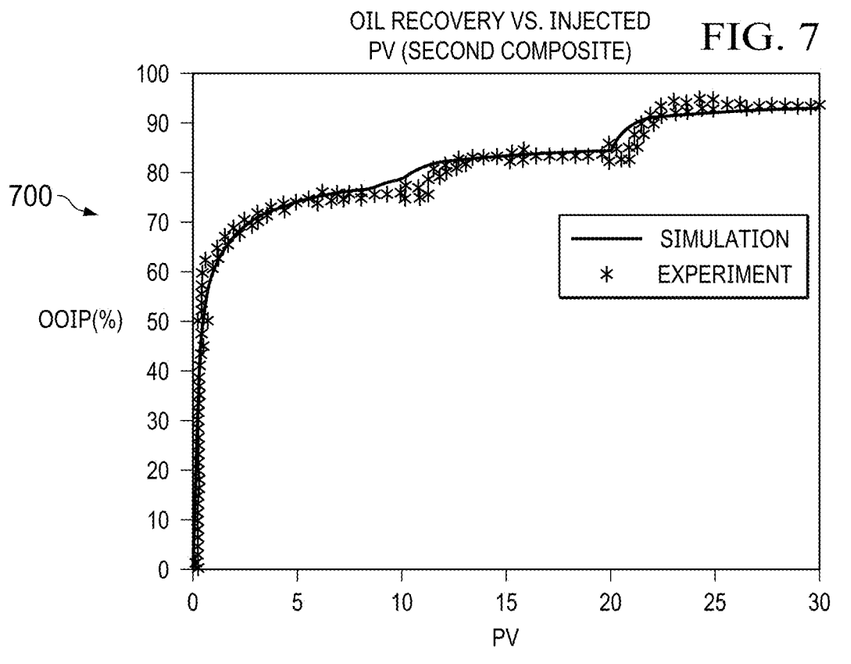
FIG. 7 illustrates a comparison between experimental and simulated results of macroscale modeling, according to some implementations of the present disclosure.

FIG. 7 illustrates a comparison between experimental and simulated results of macroscale modeling. In macroscale modeling, a macroscale model is used to predict the oil recovery for a subterranean rock sample. FIG. 7 illustrates oil recovery vs. injected pore-volumes (PV) for a subterranean carbonate rock sample. The red stars are indicative of the experimental results and the solid curve is indicative of the simulation results, which are generated, for example, using multiphase Darcy. In FIG. 7, the oil recovery is shown as a function of brine pore-volume injected. As also shown in FIG. 7, the simulation results match the core flooding experimental data. The two bumps at 10 and 20 PV are indicative of an increase in oil recovery due to a change in the water ionic composition. As described previously, the change in injected water chemistry alters the crude-oil/brine and brine/calcite interfacial properties. This alteration in interfacial properties leads to a decrease in the residual oil parameter, which results in an overall oil recovery increase.

Figure 8:
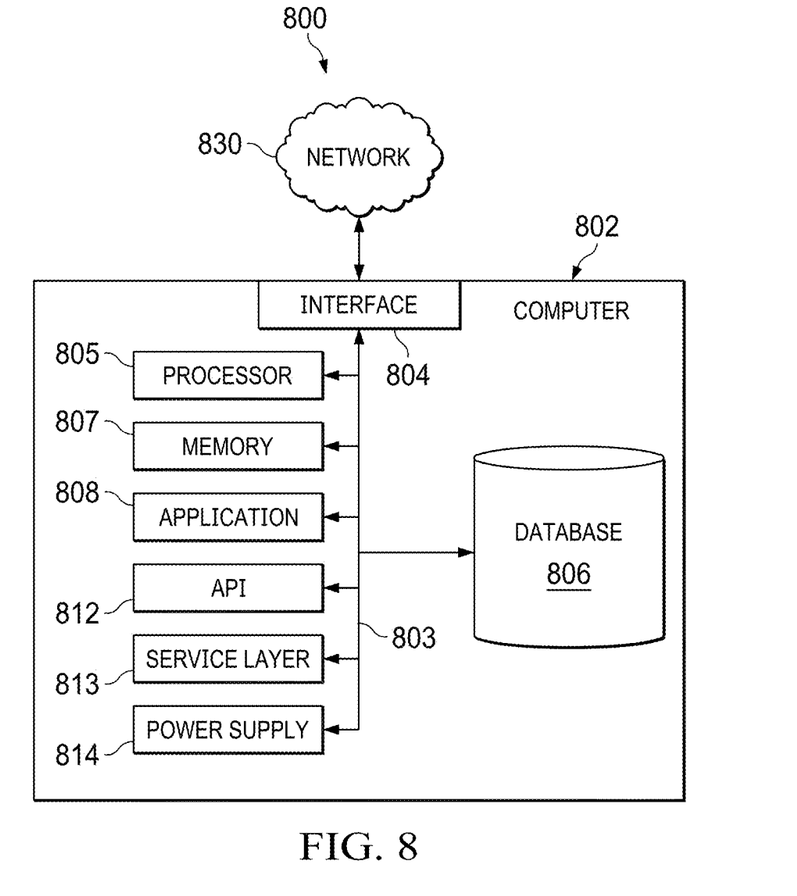
FIG. 8 illustrates a block diagram illustrating an example computer system used to provide computational functionalities associated with described algorithms, methods, functions, processes, flows, and procedures as described in the present disclosure, according to some implementations of the present disclosure.

FIG. 8 is a block diagram of an example computer system 800 used to provide computational functionalities associated with described algorithms, methods, functions, processes, flows, and procedures described in the present disclosure, according to some implementations of the present disclosure. The illustrated computer 802 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 802 can include input devices such as keypads, keyboards, and touch screens that can accept user information. Also, the computer 802 can include output devices that can convey information associated with the operation of the computer 802. The information can include digital data, visual data, audio information, or a combination of information. The information can be presented in a graphical user interface (UI) (or GUI).

The computer 802 can serve in a role as a client, a network component, a server, a database, a persistency, or components of a computer system for performing the subject matter described in the present disclosure. The illustrated computer 802 is communicably coupled with a network 830. In some implementations, one or more components of the computer 802 can be configured to operate within different environments, including cloud-computing-based environments, local environments, global environments, and combinations of environments.

At a high level, the computer 802 is an electronic computing device operable to receive, transmit, process, store, and manage data and information associated with the described subject matter. According to some implementations, the computer 802 can also include, or be communicably coupled with, an application server, an email server, a web server, a caching server, a streaming data server, or a combination of servers.

The computer 802 can receive requests over network 830 from a client application (for example, executing on another computer 802). The computer 802 can respond to the received requests by processing the received requests using software applications. Requests can also be sent to the computer 802 from internal users (for example, from a command console), external (or third) parties, automated applications, entities, individuals, systems, and computers.

Each of the components of the computer 802 can communicate using a system bus 803. In some implementations, any or all of the components of the computer 802, including hardware or software components, can interface with each other or the interface 804 (or a combination of both), over the system bus 803. Interfaces can use an application programming interface (API) 812, a service layer 813, or a combination of the API 812 and service layer 813. The API 812 can include specifications for routines, data structures, and object classes. The API 812 can be either computer-language independent or dependent. The API 812 can refer to a complete interface, a single function, or a set of APIs.

The service layer 813 can provide software services to the computer 802 and other components (whether illustrated or not) that are communicably coupled to the computer 802. The functionality of the computer 802 can be accessible for all service consumers using this service layer. Software services, such as those provided by the service layer 813, can provide reusable, defined functionalities through a defined interface. For example, the interface can be software written in JAVA, C++, or a language providing data in extensible markup language (XML) format. While illustrated as an integrated component of the computer 802, in alternative implementations, the API 812 or the service layer 813 can be stand-alone components in relation to other components of the computer 802 and other components communicably coupled to the computer 802. Moreover, any or all parts of the API 812 or the service layer 813 can be implemented as child or sub-modules of another software module, enterprise application, or hardware module without departing from the scope of the present disclosure.

The computer 802 includes an interface 804. Although illustrated as a single interface 804 in FIG. 8, two or more interfaces 804 can be used according to particular needs, desires, or particular implementations of the computer 802 and the described functionality. The interface 804 can be used by the computer 802 for communicating with other systems that are connected to the network 830 (whether illustrated or not) in a distributed environment. Generally, the interface 804 can include, or be implemented using, logic encoded in software or hardware (or a combination of software and hardware) operable to communicate with the network 830. More specifically, the interface 804 can include software supporting one or more communication protocols associated with communications. As such, the network 830 or the interface's hardware can be operable to communicate physical signals within and outside of the illustrated computer 802.

The computer 802 includes a processor 805. Although illustrated as a single processor 805 in FIG. 8, two or more processors 805 can be used according to particular needs, desires, or particular implementations of the computer 802 and the described functionality. Generally, the processor 805 can execute instructions and can manipulate data to perform the operations of the computer 802, including operations using algorithms, methods, functions, processes, flows, and procedures as described in the present disclosure.

The computer 802 also includes a database 806 that can hold data for the computer 802 and other components connected to the network 830 (whether illustrated or not). For example, database 806 can be an in-memory, conventional, or a database storing data consistent with the present disclosure. In some implementations, database 806 can be a combination of two or more different database types (for example, hybrid in-memory and conventional databases) according to particular needs, desires, or particular implementations of the computer 802 and the described functionality. Although illustrated as a single database 806 in FIG. 8, two or more databases (of the same, different, or combination of types) can be used according to particular needs, desires, or particular implementations of the computer 802 and the described functionality. While database 806 is illustrated as an internal component of the computer 802, in alternative implementations, database 806 can be external to the computer 802.

The computer 802 also includes a memory 807 that can hold data for the computer 802 or a combination of components connected to the network 830 (whether illustrated or not). Memory 807 can store any data consistent with the present disclosure. In some implementations, memory 807 can be a combination of two or more different types of memory (for example, a combination of semiconductor and magnetic storage) according to particular needs, desires, or particular implementations of the computer 802 and the described functionality. Although illustrated as a single memory 807 in FIG. 8, two or more memories 807 (of the same, different, or combination of types) can be used according to particular needs, desires, or particular implementations of the computer 802 and the described functionality. While memory 807 is illustrated as an internal component of the computer 802, in alternative implementations, memory 807 can be external to the computer 802.

The application 808 can be an algorithmic software engine providing functionality according to particular needs, desires, or particular implementations of the computer 802 and the described functionality. For example, application 808 can serve as one or more components, modules, or applications. Further, although illustrated as a single application 808, the application 808 can be implemented as multiple applications 808 on the computer 802. In addition, although illustrated as internal to the computer 802, in alternative implementations, the application 808 can be external to the computer 802.

The computer 802 can also include a power supply 814. The power supply 814 can include a rechargeable or nonrechargeable battery that can be configured to be either user- or non-user-replaceable. In some implementations, the power supply 814 can include power-conversion and management circuits, including recharging, standby, and power management functionalities. In some implementations, the power-supply 814 can include a power plug to allow the computer 802 to be plugged into a wall socket or a power source to, for example, power the computer 802 or recharge a rechargeable battery.

There can be any number of computers 802 associated with, or external to, a computer system containing computer 802, with each computer 802 communicating over network 830. Further, the terms "client," "user," and other appropriate terminology can be used interchangeably, as appropriate, without departing from the scope of the present disclosure. Moreover, the present disclosure contemplates that many users can use one computer 802 and one user can use multiple computers 802.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

Various modifications, alterations, and permutations of the disclosed implementations can be made and will be readily apparent to those of ordinary skill in the art, and the general principles defined may be applied to other implementations and applications, without departing from the scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

What is claimed is:

1. A method for multi-scale simulation of fluid flow in a subterranean formation, the method comprising:
   performing, using a nanoscale model of the subterranean formation, a first simulation of fluid-fluid and fluid-rock interactions in the subterranean formation;
   upscaling first results of the first simulation of fluid-fluid and fluid-rock interactions to a microscale level, wherein upscaling the first results comprises calculating, based on the first results, an interfacial tension of a water and oil interface;
   performing, using a microscale model of the subterranean formation and the upscaled first results, a second simulation of fluid flow inside rocks of the subterranean formation;
   upscaling second results of the second simulation of fluid flow inside rocks to a macroscale level, wherein upscaling the second results comprises calculating, based on the second results, a macroscopic permeability; and
   performing, using a core-scale model of the subterranean formation and the upscaled second results, a third simulation of fluid flow across the subterranean formation.

2. The method of claim 1, further comprising:
   determining waterflooding parameters that increase oil recovery from the subterranean formation.

3. The method of claim 1, wherein the first results comprise a set of parameters that characterize brine/crude-oil/calcite interfaces at the nanoscale, and wherein the set of parameters comprises zeta-potential for surface charges, intermolecular forces, contact-angle, adhesive, and cohesive forces.

4. The method of claim 1, wherein the second results comprise a set of parameters that characterize the fluids inside the rock pore space, and wherein the parameters comprise brine and crude-oil spatial distribution, residual oil, pressure distribution, velocity distribution, porosity, and permeability.

5. The method of claim 1, wherein third results of the third simulation of fluid flow across the subterranean formation comprise a set of parameters including pressure drop across the subterranean formation, injection rate, oil recovery rate, and connate brine composition.

6. The method of claim 1, wherein the nanoscale model is based on one or more of surface complexation models (SCM), molecular dynamics (MD), and density functional theory (DFT).

7. The method of claim 1, wherein the microscale model is based on one or more of computational fluid dynamics, Lattice-Boltzmann methods, pore-network modeling, and percolation theory.

8. The method of claim 1, wherein the core-scale model is based on one or more of multiphase Darcy's law, dual porosity theory, Darcy-Brinkman's law, and Darcy-Forchheimer's law.

9. A non-transitory, computer-readable medium storing one or more instructions executable by a computer system to perform operations comprising:
   performing, using a nanoscale model of the subterranean formation, a first simulation of fluid-fluid and fluid-rock interactions in the subterranean formation;
   upscaling first results of the first simulation of fluid-fluid and fluid-rock interactions to a microscale level, wherein upscaling the first results comprises calculating, based on the first results, an interfacial tension of a water and oil interface;
   performing, using a microscale model of the subterranean formation and the upscaled first results, a second simulation of fluid flow inside rocks of the subterranean formation;
   upscaling second results of the second simulation of fluid flow inside rocks to a macroscale level, wherein upscaling the second results comprises calculating, based on the second results, a macroscopic permeability; and
   performing, using a core-scale model of the subterranean formation and the upscaled second results, a third simulation of fluid flow across the subterranean formation.

10. The non-transitory, computer-readable medium of claim 9, further comprising:
    determining waterflooding parameters that increase oil recovery from the subterranean formation.

11. The non-transitory, computer-readable medium of claim 9, wherein the first results comprise a set of parameters that characterize brine/crude-oil/calcite interfaces at the nanoscale, and wherein the set of parameters comprises zeta-potential for surface charges, intermolecular forces, contact-angle, adhesive, and cohesive forces.

12. The non-transitory, computer-readable medium of claim 9, wherein the second results comprise a set of parameters that characterize the fluids inside the rock pore space, and wherein the parameters comprise brine and crude-oil spatial distribution, residual oil, pressure distribution, velocity distribution, porosity, and permeability.

13. The non-transitory, computer-readable medium of claim 9, wherein third results of the third simulation of fluid flow across the subterranean formation comprise a set of parameters including pressure drop across the subterranean formation, injection rate, oil recovery rate, and connate brine composition.

14. The non-transitory, computer-readable medium of claim 9, wherein the nanoscale model is based on one or more of surface complexation models (SCM), molecular dynamics (MD), and density functional theory (DFT).

15. The non-transitory, computer-readable medium of claim 9, wherein the microscale model is based on one or more of computational fluid dynamics, Lattice-Boltzmann methods, pore-network modeling, and percolation theory.

16. A computer-implemented system, comprising:
    one or more processors; and
    a non-transitory computer-readable storage medium coupled to the one or more processors and storing programming instructions for execution by the one or more processors, the programming instructions instructing the one or more processors to perform operations comprising:

performing, using a nanoscale model of the subterranean formation, a first simulation of fluid-fluid and fluid-rock interactions in the subterranean formation;

upscaling first results of the first simulation of fluid-fluid and fluid-rock interactions to a microscale level, wherein upscaling the first results comprises calculating, based on the first results, an interfacial tension of a water and oil interface;

performing, using a microscale model of the subterranean formation and the upscaled first results, a second simulation of fluid flow inside rocks of the subterranean formation;

upscaling second results of the second simulation of fluid flow inside rocks to a macroscale level, wherein upscaling the second results comprises calculating, based on the second results, a macroscopic permeability; and performing, using a core-scale model of the subterranean formation and the upscaled second results, a third simulation of fluid flow across the subterranean formation.

17. The computer-implemented system of claim 16, the operations further comprising:

determining waterflooding parameters that increase oil recovery from the subterranean formation.

18. The computer-implemented system of claim 16, wherein the first results comprise a set of parameters that characterize brine/crude-oil/calcite interfaces at the nanoscale, and wherein the set of parameters comprises zeta-potential for surface charges, intermolecular forces, contact-angle, adhesive, and cohesive forces.

19. The computer-implemented system of claim 16, wherein the second results comprise a set of parameters that characterize the fluids inside the rock pore space, and wherein the parameters comprise brine and crude-oil spatial distribution, residual oil, pressure distribution, velocity distribution, porosity, and permeability.

20. The computer-implemented system of claim 16, wherein the core-scale model is based on one or more of multiphase Darcy's law, dual porosity theory, Darcy-Brinkman's law, and Darcy-Forchheimer's law.

* * * * *